United States Patent [19]

Sperber et al.

[11] 4,081,839

[45] Mar. 28, 1978

[54] AURAL-VISUAL RATIO CONTROL APPARATUS

[75] Inventors: Martin Sperber, Cranford; Ragnars Martin Eggerts, Old Bridge; George Scherer, East Brunswick, all of N.J.

[73] Assignee: Blonder-Tongue Laboratories, Inc., Old Bridge, N.J.

[21] Appl. No.: 733,131

[22] Filed: Oct. 18, 1976

[51] Int. Cl.² ............................................. H04N 5/62
[52] U.S. Cl. ................................. 358/186; 325/327; 358/174; 358/197
[58] Field of Search ............... 358/174, 175, 186, 196, 358/197, 904; 325/327

[56] References Cited

U.S. PATENT DOCUMENTS

| | | | |
|---|---|---|---|
| 2,880,269 | 3/1959 | Dome | 325/327 X |
| 3,024,306 | 3/1962 | Combs et al. | 358/174 X |

*Primary Examiner*—Robert L. Richardson
*Attorney, Agent, or Firm*—Rines and Rines, Shapiro and Shapiro

[57] ABSTRACT

This disclosure is concerned with obtaining aural-visual ratio control with novel intercarrier detection cooperative with a high-Q notch filter feeding a strip amplifier or heterodyne processor.

3 Claims, 1 Drawing Figure

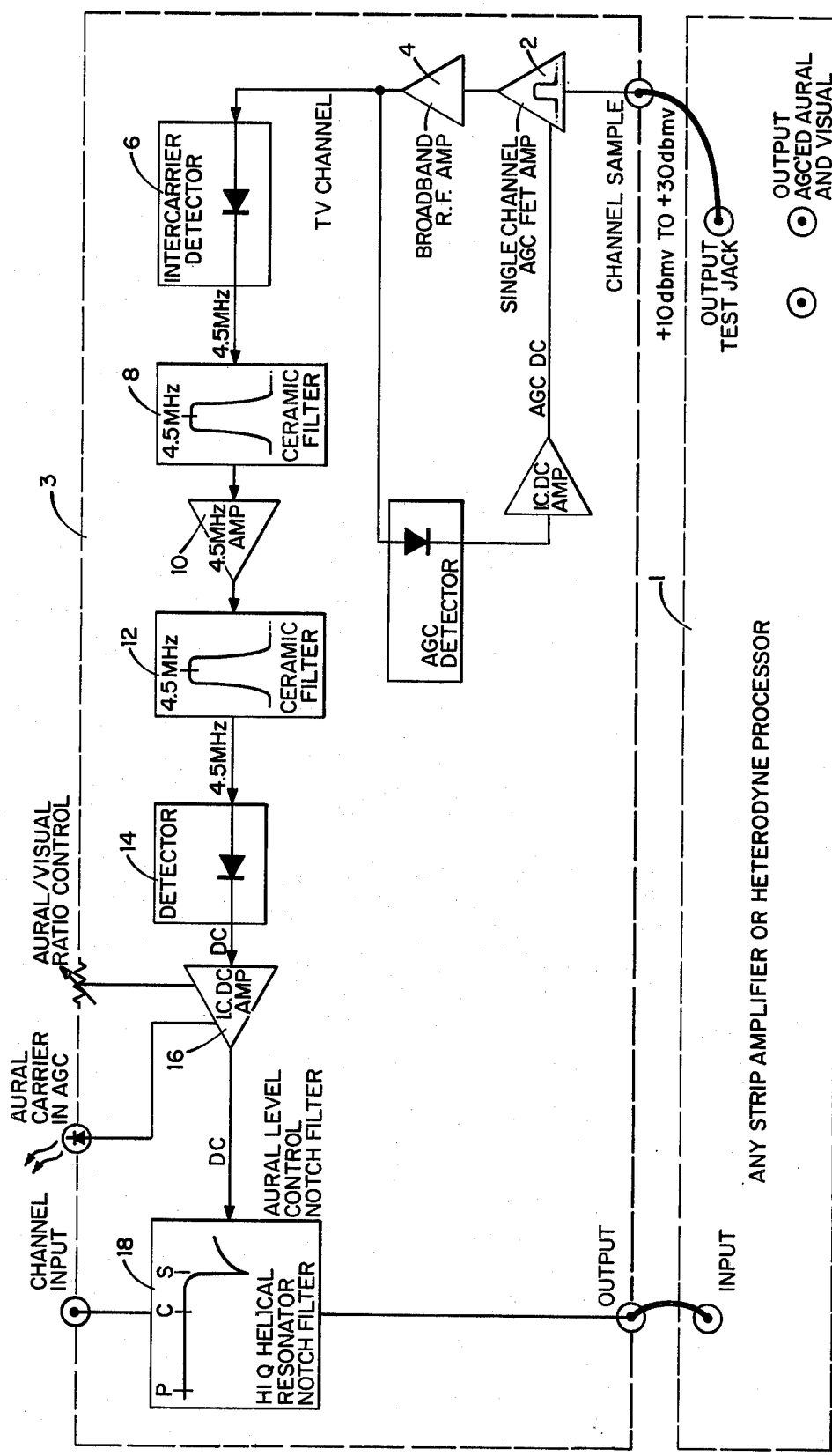

AURAL-VISUAL RATIO CONTROL APPARATUS

The present invention relates to apparatus for controlling the ratio of different carrier signals such as, for example, visual (picture) and aural (sound) carriers used in television, though it is more generically adaptable for ratio controls in other applications, as well.

Previous systems for controlling picture and sound ratio have included the Model 1520 Blonder-Tongue Picture-to-Sound Ratio Stabilizer published in the instruction manual therefor of Apr. 6, 1964 by the assignee of the present application. In accordance with that system, the sound carrier of any VHF television signal was maintained between 6 and 20 db below the picture carrier level by a closed loop system employing a varactor-tuned front-end trap as the controlling element, with the picture-to-sound ratio being conveniently set by the operator. Such equipment was designed for black and white television in the era before the more stringent requirements of present-day color systems, and had inherent limitation that the sound level variability was detected by means of a narrow band filter at the frequency of the sound carrier. Such operation, however, is unacceptable for the demands of color as to subcarrier information.

For such usage, as described, for example, in Cable Communications, Volume 40 No. 6, Aug. 1974, general heterodyne processors may be employed with automatic filter or notch control for electronic filtering that can attenuate the sound carrier only to a selected level between 15 and 20 db below the video carrier, being thus suitable for the more stringent requirements of color television.

The purpose of a channel processor is to take the raw television signal as received off the air and condition it so that it is suitable for transmission over a cable in the presence of numerous other television signals occurring on different channels. For this purpose, the level has to be maintained with some form of automatic gain control; and in order to prevent interference with adjacent channels, the sound carrier has to be maintained accurately at a level, usually about 15 db below the picture carrier. The most common approach that has been used is that of the heterodyne processor which has the single advantage that all processing of the signal is done at a fixed, low, intermediate frequency (IF) where tuned circuit problems are minimized.

In the IF section of a heterodyne processor, the picture and sound carriers are commonly separated with the sound carrier passed through a separate amplifier chain where it is limited, much as signals are limited in the IF chain of an FM receiver in order to maintain constant level. The picture carrier is passed through a separate amplifier chain where it is automatically gain controlled in a more normal manner, before these two carriers are again recombined. The approach of separating and recombining the carriers, however, has as its principal disadvantage the fact that relatively sharp filters and traps are required, and there is always a danger that phase variation may be introduced at the color subcarrier, which is relatively close to the sound carrier in frequency, thereby causing color distortion. A system of this character is described, for example, in the Jerrold Instruction Book for Commander II Equipment, pages 6 and 7.

In accordance with the present invention on the other hand, minimum tampering with the TV signal is done in the head-end equipment. It has been found, for example, that most heterodyne processors are severely limited in their ability to discriminate against extremely strong signals on adjacent or alternate channels. The invention therefore restricts signal processing to what is called an on-channel mode; that is to say, the frequency of the incoming signal is not changed unless it is to be ultimately carried on the cable on a different channel than that received. Since the high frequencies at which TV signals are transmitted make it impractical to design and build competitive very sharp filters required by the heterodyne processor intermediate chain, the invention employs other means of controlling the sound carrier; namely, a notch filter, otherwise known as a trap, that is designed sharply enough to discriminate against the nearby color subcarrier while controlling the amplitude of the sound carrier.

While this notch filter concept of controlling the sound is essentially the same that was used in the before-mentioned previous Model 1520 picture-sound ratio stabilizer, it is employed with two distinctions for the purposes herein. The first is the use of a much higher Q circuit for the notch filter so that it is able to discriminate more completely against the color subcarrier; and the other difference is the means by which the sound carrier is detected. By using the intercarrier technique, where the difference frequency between the spound carrier and the picture carrier is detected, all filtering and discrimination in the AGC system can be done at the visual-aural difference frequency (say, 4.5 MHz).

Intercarrier detection is possible because the visual or picture carrier has been previously gain-controlled, and is thus stable at the input of the intercarrier detector. The amplitude of the carrier detector output, therefore, will now be proportional only to the difference in amplitude between the stabilized visual and non-stabilized aural carrier.

An object of the invention, thus, is to provide a new and improved apparatus for aural-visual ratio control that shall not be subject to the above-described disadvantages of prior art approached, but that, to the contrary, enables vastly improved discrimination against strong adjacent signals and with simpler circuit elements.

A further object is to provide a novel picture-sound ratio control or similar different-frequency-range ratio control of more general applicability, as well.

Other and further objects will be described hereinafter and are more fully pointed out in the appended claims. In summary, however, from one of its important aspects the invention embraces an aural-visual ratio control apparatus having, in combination, at least one of channel amplifier and heterodyne processor means having input and output terminals; means for connecting the output terminals to single channel RF amplifier means to apply thereto aural and visual carrier signals with the latter being AGC stabilized; intercarrier detector means connected to the amplifier means for producing an output representing the difference between the visual and aural carrier frequencies, directly proportional to variation in the aural carrier; means for narrow-band filtering the output of the intercarrier detector means and detecting the same to produce an aural level DC variable control signal; high-Q resonator notch filter means having an input and an output and a DC notch depth control means responsive to said DC variable control signal; means for applying television channel composite aural-visual signals to the said input of the notch filter and connecting the said output thereof with the said input terminals of said one of the channel amplifier and heterodyne processor means.

The invention will now be described with reference to the accompanying drawing, the single FIGURE of which is a schematic block diagram illustrating the invention in preferred form.

Referring to the bottom of the drawing, an amplifier or heterodyne processor 1 is illustrated, having an input and an output. The input to the processor 1, so-labelled, is taken from the output of a high-Q level control notch filter 18, as of the helical resonator type, disposed in the control apparatus 3, and which in turn has received its composite aural-visual signal from the off-the-air antenna or other channel input, so-labelled. A sample of the output of the channel processor 1 is fed to an RF gain-controlled pre-amplifier 2-4, located within the aural-visual ratio control apparatus 3. In practice, a signal of from, say, +10 dbmv to + 30 dbmv will be applied from the processor 1 as the channel sample to, for example, a single channel FET amplifier 2, feeding a broadband RF amplifier 4, part of the output of which is applied through an AGC detector and IC DC amplifier, so-labelled, to effect stabilization.

The stabilized visual or picture carrier and aural or sound carrier combination at the output of amplifier 4 is fed to an intercarrier detector 6 where the 4.5 MHz frequency is detected, as indicated, with its amplitude being proportional to the ratio between visual and aural carrier amplitudes. After further filtering and linear amplifying in ceramic filters 8 and 12 disposed in the input and output, respectively, of the amplifier 10, the 4.5 MHz frequency is detected at 14 and DC amplified at 16. The amplified DC is used to control the depth at S of the notch filter 18, as by means of a PIN diode, schematically represented by the arrow at "DC". Flat response to the left of S is shown in the range C to P. Aural-visual ratio control variation may be effected by the variable gain resistor, so-labelled, associated with amplifier 16. Additionally, a means is provided to indicate to the operator when the AGC system is operative as by the light-emitting element at AURAL CARRIER IN AGC.

The intercarrier detector 6 may be considered as a linear mixer, provided with two input signals from the RF amplifier 4; one may be viewed as a stabilized, local oscillator or picture carrier which has been previously AGC'd, and the other, a substantially lower level, aural carrier that has not been prestabilized. The difference output of the mixer or detector 6 is the picture carrier frequency less the aural carrier frequency, or 4.5 MHz—now directly proportional to the variation in the aural carrier. Incorporation of the narrow band by the filters 8 and 12 and linear amplifier 10 eliminates substantially all undesired components of intelligence, such as color information and video, and applies to the detector 14 essentially a pure CW 4.5 MHz signal. The detector 14 then converts this CW amplitude to DC, which is used proportionally to control the depth of the response of the notch filter or trap 18, as before explained.

Suitable equipment for practicing the invention may include the strip amplifier or heterodyne processor 1 of the type BT Model MCA or MCABTV, or a Jerrold Commander I, Commander II, or Commander III, to activate the aural-visual ratio control system. The BT MCA and similar equipments are described, for example, in TV Communications, Feb.-Mar. 1974, "A Hard Look At Head End Processing or Strip Amps, Heterodynes, Demods" by R. F. St. Louis.

Further variations and modifications will suggest themselves to those skilled in this art, and such are considered to fall within the spirit and scope of the invention as defined in the appended claims.

What is claimed is:

1. An aural-visual ratio control apparatus having, in combination, at least one of channel amplifier and heterodyne processor means having input and output terminals; means for connecting the output terminals to single channel RF amplifier means to apply thereto aural and visual carrier signals with the latter being AGC stabilized; intercarrier detector means connected to the amplifier means for producing an output representing the difference between the visual and aural carrier frequencies, directly proportional to variation in the aural carrier; means for narrow-band filtering the output of the intercarrier detector means and detecting the same to produce an aural level DC variable control signal; high-Q resonator notch filter means having an input and output and a DC notch depth control means responsive to said DC variable control signal; means for applying composite aural-visual signals to the said input of the notch filter and connecting the said output thereof with the said input terminals of said one of the channel amplifier and heterodyne processor means.

2. An aural-visual ratio control apparatus as claimed in claim 1, and in which said RF amplifier means comprises a single channel FET amplifier feeding a broadband RF amplifier part of the output of which is connected through an AGC detector and IC DC amplifier to AGC-control the single channel amplifier.

3. Apparatus as claimed in claim 1 and in which the means for detecting the narrow-band-filtered output of the intercarrier detector means is provided with DC amplifier means provided with at least one of aural-visual ratio control means and aural carrier AGC-operation indicating means.

* * * * *